United States Patent
Gravel, Jr.

[11] 3,841,446
[45] Oct. 15, 1974

[54] DISC BRAKE CALIPER AND ANTI-RATTLE SUPPORT

[75] Inventor: Charles R. Gravel, Jr., South Bend, Ind.

[73] Assignee: The Bendix Corporation, South Bend, Ind.

[22] Filed: June 26, 1973

[21] Appl. No.: 373,706

[52] U.S. Cl. .............................. 188/73.5, 188/73.3
[51] Int. Cl. ............................................ F16d 65/02
[58] Field of Search ..... 188/73.5, 73.3, 72.4, 205 A

[56] References Cited
UNITED STATES PATENTS

| 3,388,774 | 6/1968 | Burnett | 188/73.5 |
| 3,677,372 | 7/1972 | Burnett | 188/73.5 X |

*Primary Examiner*—George E. A. Halvosa
*Attorney, Agent, or Firm*—William N. Antonis; William N. Antanis

[57] ABSTRACT

A pair of removable, replaceable spring clips retain the caliper of a disc brake assembly on the torque member thereof. Each of the clips includes an arcuate portion having an inner circumferential surface which embraces the outer circumferential surface of torque-carrying pins carried by the caliper and therefore serve as a removable, replaceable torque-taking seat for the pins. The arcuate portions of the clips are received in corresponding recesses provided on opposite edges of the torque-taking member and therefore retain the pins on the member. An armlike portion extends from the arcuate portion of the clips, and a bolt fastens the arm portions to corresponding edges of the torque-taking member. The clips are made of a resilient material and are stressed when the caliper is mounted on the torque-taking member so that the clips prevent rattling of the caliper on the torque-taking member.

5 Claims, 3 Drawing Figures

PATENTED OCT 15 1974 3,841,446

DISC BRAKE CALIPER AND ANTI-RATTLE SUPPORT

BACKGROUND OF THE INVENTION

This invention relates to a disc brake.

Most disc brakes now manufactured for automotive uses are of the so-called "floating caliper" type, in which the caliper moves relative to a stationary torque-taking member when a brake application is effected. These brakes require a flotation system interconnecting the caliper and the fixed support which not only must slidably support the caliper, but which also must take appreciable amounts of braking torque. One common flotation design provides a pair of axially extending, torque-taking pins on opposite sides of the caliper which are received within recesses on opposite sides of the torque-taking member. The present invention relates to a pair of removable clips which are disposed between the pins and the torque-taking member, which provide a replaceable seat for the torque-taking pins and which also secure the caliper to the torque-taking member. The clips are made of a resilient material and are stressed when the caliper is mounted on the torque-taking member so that the clips also serve as antirattle springs to prevent the caliper and torque member from rattling.

SUMMARY OF THE INVENTION

Therefore, an important object of my invention is to design an improved flotation system for sliding caliper disc brakes.

Another important object of my invention is to provide seats for torque-carrying pins used in disc brakes which slidably mount the caliper to the torque-taking member.

A further object of my invention is to provide a simple means of retaining the caliper of a disc brake on the torque-taking member thereof.

Still another important object of my invention is to provide an inexpensive antirattle spring for a disc brake.

DETAILED DESCRIPTION

Figure 2:
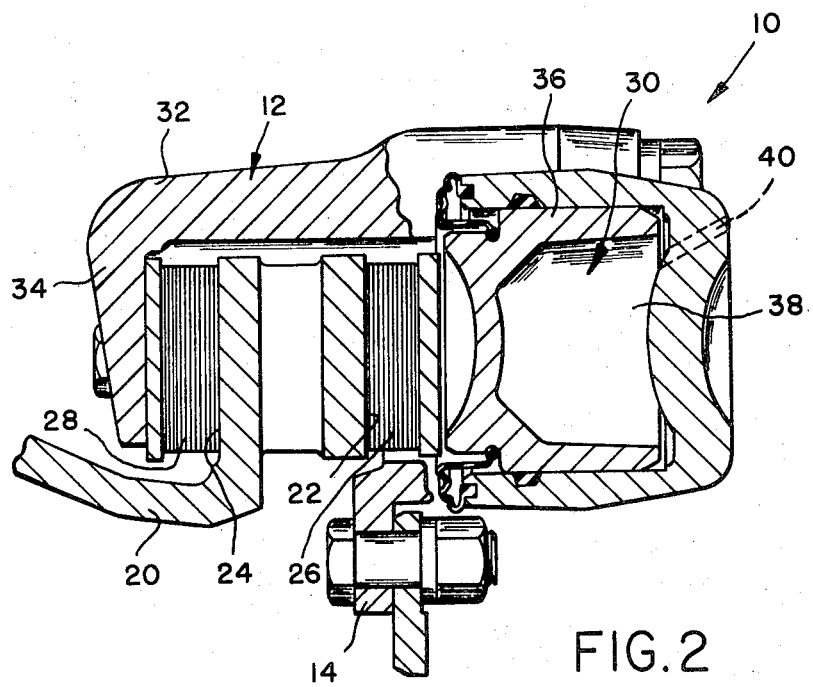
FIG. 2 is a cross-sectional view taken substantially along lines 2—2 of FIG. 1.
Figure 3:
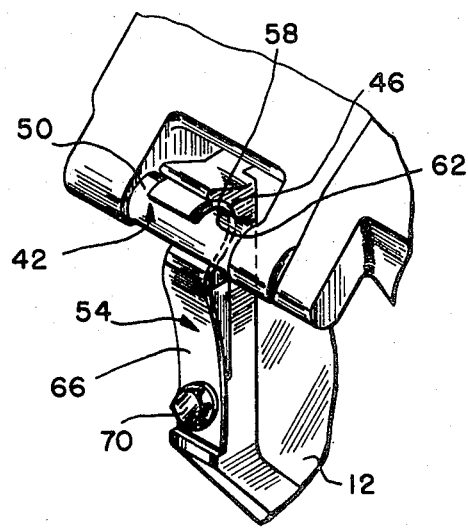
FIG. 3 is a fragmentary perspective view of the flotation system of the disc brake of my invention.

Referring now to the drawings, a disc brake generally indicated by the numeral 10 includes a caliper 12 slidably mounted on a stationary, torque-taking member 14, which is rigidly mounted on a nonrotating portion of the vehicle. Flotation means generally indicated by the numerals 16 an 18 slidably mount opposite edges of the caliper 12 to corresponding edges of the torque-taking member 14 so that the caliper 12 may move transversely with respect to the torque-taking member 14 during a brake application. Disc brake 10 further includes the usual rotor 20 which is mounted for rotation with a corresponding vehicle wheel. The rotor 20 has a pair of friction faces 22, 24 which are engaged by friction elements 26, 28 carried adjacent thereto, when a brake application is effected. The caliper 12 includes a fluid motor portion 30 extending adjacent the friction element 28 and friction face 22, a bridge portion 32 which extends over the periphery of the rotor 20, and an inwardly extending portion 34 which extends inwardly adjacent the friction element 28 and friction face 24. A piston 36 is slidably mounted within the fluid motor portion 30 and cooperates with the end thereof to define a variable volume fluid chamber 38 therebetween. When a brake application is effected, fluid under pressure is communicated into the variable volume chamber 38 through inlet port 40 from a suitable pressure source, such as the vehicle's master cylinder (not shown). High pressure fluid in the variable volume chamber 38 acts on the piston 36 urging the latter to the left viewing FIG. 2 so that the friction element 26 is urged into frictional engagement with the frictional face 22. Furthermore, due to the slidable connection between the caliper and torque-taking member 14, reaction forces acting through the bridge portion 32 and inwardly extending portion 34 also urge the friction element 28 into frictional engagement with the friction face 24, to thereby effect a brake application.

Figure 1:
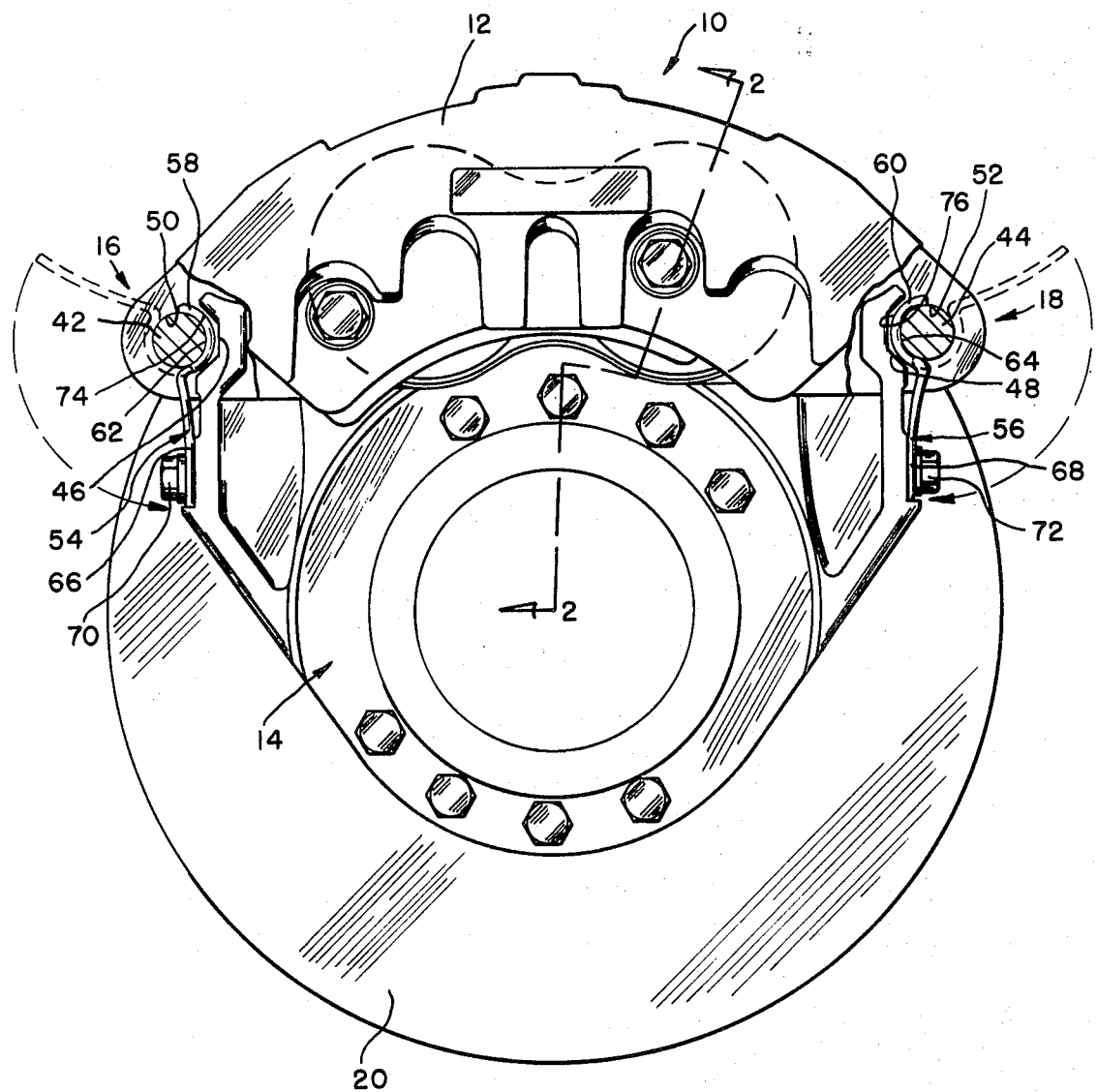
FIG. 1 is a side elevational view, partly in section, of a disc brake made pursuant to the teachings of my present invention.

Flotation means 16, 18 include a pair of pins 42, 44 which are mounted on opposite edges of the caliper 12, and which extend transversely with respect to the plane of the torque-taking member 14 and parallel to the axis of rotation of the rotor or disc 20. Corresponding recesses 46, 48 are provided on opposite edges of the torque member 14 and correspond with pins 42 and 44, respectively. The distance between the pins 42 and 44 is sufficiently greater than the distance between edges of the recesses 46 and 48 so that when the caliper 12 is installed on the torque member 14, a gap is defined between the outer circumferential surfaces 50, 52 of the pins 42, 44, respectively and the edges of their corresponding recesses 46, 48. The recesses 46 and 48 are sufficiently shallow so that a substantial portion of the outer circumferential surfaces 50, 52 of the pins 42, 44 respectively, extend out of their corresponding recesses 46, 48. A pair of resilient clips 54, 56 are provided to retain the caliper on the torque-taking member 14. Each of the clips 54, 56 include an arcuate portion 58, 60 which are disposed in the corresponding gaps between the recesses 46, 48 and their pins 42, 44. Arcuate portions 58, 60 include inner circumferential surfaces 62, 64 which embrace a portion of the outer circumferential surfaces 50, 52 of the corresponding pins 42, 44. The inner circumferential surfaces 62, 64 therefore serve as seats for the pins 42, 44. Since the clips 54, 56 are quite simple, and are therefore inexpensive, they may be easily replaced when the brake is surfaced to assure a smooth sliding surface to support the pins 42, 44. Since the pins 42, 44 carry the braking torque, it is very important that they have a proper surface for their support. Pins 54, 56 further include armlike portions 66, 68 which extend from the arcuate portions 58, 60 respectively. Arm portions 66 and 68 extend substantially parallel to the edges of the torque member 14 adjacent the recesses 46, 48. Bolts 70, 72 are provided to fasten the arm portions 66 and 68, respectively, to the corresponding edges of the torque member 14. The arcuate portion 60 and arm portion 68 of clip 56 are shaped or positioned so that when arm portion 68 is secured to torque member 14 by bolt 72 the outer circumferential surface 76 of clip 56 is urged against the wall of the recess 48. The arcuate portion 58 and arm portion 66 of the clip 54 are shaped or positioned so that when the arm portion 66 is secured to the torque member 14 by the bolt 70, the clip 54 will be stressed. Since the clip 54 is resilient, the resiliency of the clip 54 biases the pin 42 outwardly of the recess 46 so that the outer circumferential surface 74 of the clip 54 is urged away from the wall of the recess 46. Similarly, due to the resiliency of the clip 54, the outer circumferential surface 52 of the pin 44 is urged into seating engagement with the inner circumferential surface 64 of clip 56. The resiliency of the clip 54 therefore exerts the biasing force on the caliper 12 to prevent the latter from rattling on the torque member 14. It should be noted that the distance between the outer circumferential surface 74 of the clip 54 and the wall of the recess 46 has been exaggerated in FIG. 1 for purposes of illustration. Actually, the arcuate portions of the clips 54 and 56 substantially fill the gap defined between the outer circumferential surfaces 50, 52 of the pins 42, 44 and the walls and their corresponding recesses 46, 48, so that the caliper cannot be accidentally dislodged from the torque member when the vehicle is driven.

From time to time it is necessary to remove the caliper 12 from the torque member 14. For example, wear of the friction elements 26, 28 requires their replacement several times during the life of the vehicle. When this is done, the clips 54, 56 are removed, and the caliper may then be lifted off the torque member 14. When the caliper is reassembled, the caliper is first positioned on the torque member 14 with the corresponding pins 42, 44 loosely received within the corresponding recesses 46, 48. The clips 54 and 56 are inserted on the caliper 12 by first bringing the inner circumferential surfaces of the latter into engagement with that portion of the outer circumferential surfaces of their corresponding pins 42, 44 which project from the recesses 46, 48. When this is done, the clips 54 and 56 will be disposed in the position illustrated by the phantom lines in FIG. 1. The arm portions 66, 68 of clips 54, 56 are then rotated by the mechanic, so that their arcuate portions are rotated about their corresponding pins 42, 44 in the direction of the arrow A. As this is done, the arcuate portion 58 is brought into the gap between the recess 46 and the pin 42. When the armlike portion 66 is brought into engagement with the edge of the torque member 14, the bolt 70 is installed, to stress the clip 54 into the position illustrated in the drawing.

I claim:
1. In a disc brake:
a fixed support member;
a caliper;
means slidably mounting said caliper on said support member for transverse movement with respect thereto;
said mounting means including a pair of outwardly facing recesses on opposite edges of said support member, a pair of pins carried on opposite edges of said caliper and extending transversely with respect to said recesses, each of said recesses embracing a substantial arcuate portion of the outer circumferential surface of its corresponding pin, one of said pins cooperating with a corresponding recess to define a gap between the outer circumferential surface of said pin and the wall of its corresponding recess, a clip having an arcuate portion located in said gap and an arm portion extending from said arcuate portion adjacent to the corresponding edge of said fixed support when the arcuate portion is located in said gap, said arcuate portion having inner and outer circumferential surfaces, the inner circumferential surface of said arcuate portion embracing at least the entire arcuate length of said arcuate portion of the outer circumferential surface of the corresponding pin embraced by said recess, and means fastening said arm portion to said fixed support.

2. The invention of claim 1:
said clip being resilient, said arcuate portion being disposed away from the edge of the corresponding recess, said fastening means holding the opposite end of said arm portion against the fixed support to stress said clip, whereby the resiliency of said clip prevents rattling of the caliper against said fixed support.

3. The invention of claim 1:
said clip being resilient, said fastening means holding said arm portion of the clip against said fixed support to stress said clip, whereby the resiliency of the clip prevents rattling of the caliper against said fixed support.

4. The invention of claim 3:
there being two of said clips, one for each pin and its corresponding recess.

5. The invention of claim 4:
the resiliency of one of said clips urging the outer circumferential surface of the arcuate portion of the latter away from the wall of its corresponding recess and biasing the caliper to maintain the outer circumferential surface of the outer pin into engagement with the inner circumferential surface of its corresponding clip.

* * * * *